United States Patent
Atkey et al.

(10) Patent No.: US 11,041,501 B2
(45) Date of Patent: Jun. 22, 2021

(54) COMPRESSED AIR SYSTEM

(71) Applicant: The Boeing Company, Chicago, IL (US)

(72) Inventors: Warren A. Atkey, Bothell, WA (US); Steve G. Mackin, Bellevue, WA (US); Royal E. Boggs, N. Charleston, SC (US); Hosam E. El-Gabalawy, Bothell, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 16/359,331

(22) Filed: Mar. 20, 2019

(65) Prior Publication Data

US 2020/0300257 A1   Sep. 24, 2020

(51) Int. Cl.
*F04D 27/00* (2006.01)
*F02C 9/18* (2006.01)
*F04D 27/02* (2006.01)

(52) U.S. Cl.
CPC .............. *F04D 27/004* (2013.01); *F02C 9/18* (2013.01); *F04D 27/02* (2013.01)

(58) Field of Classification Search
CPC ...... F04D 27/002; F04D 27/004; F04D 27/02; F02C 9/18; F02C 6/08; F05D 2270/303; F05D 2270/112; F05D 2270/101
See application file for complete search history.

(56) References Cited

U.S. PATENT DOCUMENTS

| | | | |
|---|---|---|---|
| 7,077,658 B1 | 7/2006 | Ashman et al. | |
| 9,163,562 B2 | 10/2015 | Suciu et al. | |
| 9,810,158 B2* | 11/2017 | Foutch | F02C 7/18 |
| 2016/0167789 A1 | 6/2016 | Knight et al. | |
| 2016/0369705 A1 | 12/2016 | Mackin et al. | |
| 2017/0008633 A1* | 1/2017 | Parmentier | F04D 29/522 |
| 2017/0268430 A1* | 9/2017 | Schwarz | B64D 13/06 |

FOREIGN PATENT DOCUMENTS

| | | |
|---|---|---|
| DE | 102008026732 | 12/2009 |
| EP | 2620616 | 7/2013 |
| EP | 3260685 | 12/2017 |

OTHER PUBLICATIONS

European Search Report dated Dec. 10, 2019; European Application No. EP19191881.2.

(Continued)

*Primary Examiner* — Richard A Edgar
(74) *Attorney, Agent, or Firm* — Perman & Green LLP (57) ABSTRACT

A method for controlling compressed air sent to pneumatic systems. The method includes acquiring a set of performance demands for each of a plurality of pneumatic systems in a platform, where the performance demands indicate needs for the compressed air supplied to each of the pneumatic systems, identifying a maximum allowable air discharge temperature limit of a variable speed air compressor configured to supply compressed air to the pneumatic systems, and controlling an operation of the compressor to supply the compressed air to the pneumatic systems to meet the acquired performance demands for at least one of the pneumatic systems while operating the compressor below the maximum allowable air discharge temperature limit.

20 Claims, 6 Drawing Sheets

(56) References Cited

OTHER PUBLICATIONS

Methfessel et al.; "Design of a Balance-Fed Patch-Excited Horn Antenna at Millimeter-Wave Frequencies", Antennas and Propagation (EUCAP), 2010 Proceedings of the Fourth European Conference, IEEE, Piscataway, NJ, USA, Apr. 12, 2010, pp. 1-4.
European Search Report dated Jul. 20, 2020; European Applicaion No. EP20153469.

* cited by examiner

COMPRESSED AIR SYSTEM

BACKGROUND

The present disclosure relates generally to aircraft and, in particular, to generating compressed air for pneumatic systems in the aircraft.

In an aircraft, many pneumatic systems use compressed air to operate. The compressed air is often obtained from bleed air drawn from an aircraft engine. A throttle controls the thrust generated by the aircraft engine, which in turn affects the pressure and flow of bleed air. As such, the flow and pressure of the compressed air supplied to the pneumatic systems is a function of the aircraft engine throttle position.

However, the bleed air being discharged from the aircraft engine, at a particular throttle setting, may not meet the demands of the pneumatic systems. One solution to this problem is to reposition the throttle to adjust the flight idle thrust or ground idle thrust of the aircraft engine. However, adjusting the flight idle thrust or the ground idle thrust has inefficiencies and limitations.

Conversely, the bleed air being discharged from the aircraft engine, at a particular throttle setting, may be in excess of the pneumatic system demands Such conditions represent higher power extraction from the engines than is necessary to meet the pneumatic systems demands. This excess power extraction represents unnecessary fuel burn.

Therefore, it would be desirable to have a method and apparatus that take into account at least some of the issues discussed above, as well as other possible issues. For example, it would be desirable to have a method and system that overcome a technical problem with supplying compressed air to pneumatic systems with a desired level of efficiency.

SUMMARY

The features and functions can be achieved independently in various embodiments of the present disclosure or may be combined in yet other embodiments in which further details can be seen with reference to the following description and drawings.

One example of the subject matter according to the present disclosure is a method for controlling compressed air sent to pneumatic systems. The method includes acquiring a set of performance demands for each of a plurality of pneumatic systems in a platform, where the performance demands indicate needs for the compressed air supplied to each of the pneumatic systems, identifying a maximum allowable air discharge temperature limit of a variable speed air compressor configured to supply compressed air to the pneumatic systems, and controlling an operation of the compressor to supply the compressed air to the pneumatic systems to meet the acquired performance demands for at least one of the pneumatic systems while operating the compressor below the maximum allowable air discharge temperature limit.

BRIEF DESCRIPTION OF THE DRAWINGS

The features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments provide a method, system, and apparatus for controlling compressed air sent to pneumatic systems in a platform such as an aircraft. In one illustrative example, a controller is configured to identify one or more performance demands for a plurality of pneumatic systems. As used herein, a performance demand is an optimal pressure, flow rate, and/or temperature of the compressed air that is required by a pneumatic system to enable the pneumatic system to operate at a peak efficiency.

In the exemplary embodiment, each pneumatic system may require compressed air that meets a set of performance demands. The set of performance demands may include a single performance demand, two performance demands, or three or more performance demands. For example, a first pneumatic system may have a set of performance demands that require the pneumatic system to receive compressed air at 40 pounds per square inch (PSIA), 4 lbs/sec, and an air temperature greater than 200 degrees Fahrenheit (F) to operate at peak efficiency. Thus, the first example pneumatic system has a set that includes three performance demands, i.e. (>40 PSIA, >4 lbs/sec, and >200F). A second different pneumatic system may have a set of performance demands that includes two performance demands (>20 PSIA, >3 lbs/sec, and >350F). In particular, the second pneumatic system requires compressed air to be provided at 20 PSIA and greater than 3 lbs/sec to operate at peak efficiency. The performance demands therefore indicate a unique set of parameters to enable each pneumatic system to operate at its peak efficiency.

In operation, a controller acquires a set of performance demands for each of a plurality of pneumatic systems in a platform, such as an aircraft. The controller also identifies a maximum allowable air discharge temperature limit of a variable speed air compressor that is configured to supply the compressed air to the pneumatic systems. The controller then utilizes the performance demands received from the pneumatic systems and the maximum allowable air discharge temperature limit to control the operation of the variable speed air compressor. In particular, the controller utilizes the acquired information to supply compressed air to each of the pneumatic systems while also ensuring that the compressor is operated below the maximum allowable air discharge temperature limit of the compressor.

In an exemplary embodiment, the controller determines a target compressor operating map point based on the performance demands of the pneumatic systems. The controller also identifies a maximum allowable air discharge temperature limit of the variable speed air compressor configured to supply compressed air to the pneumatic systems. The controller then operates the compressor at the target map point to supply the compressed air to the pneumatic systems while also ensuring that the compressor does not exceed the maximum allowable air discharge temperature limit.

As a result, and relative to an electric based secondary power system architecture, this embodiment can reduce the complexity of the electrical power system and air conditioning system. Relative to an engine bleed air based pneumatic secondary power system, this embodiment can reduce fuel consumption, facilitate easier integration with modern high bypass ratio engines, aircraft composite structure, and fuel systems.

Figure 1:
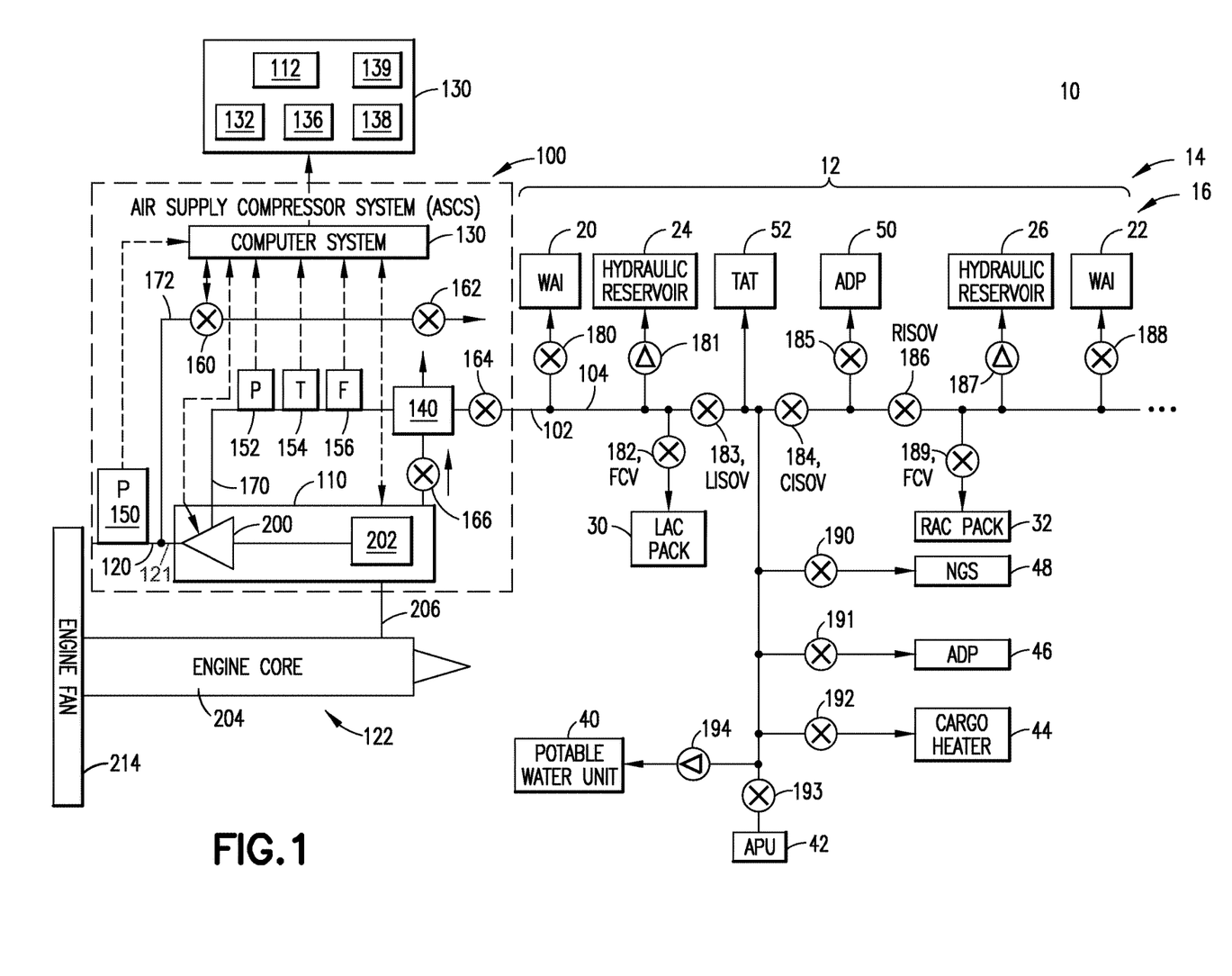
FIG. 1 is an illustration of a compressed air environment in accordance with an illustrative embodiment.

With reference now to the figures and, in particular, with reference to FIG. 1, an illustration of a compressed air environment is depicted in accordance with an illustrative embodiment. In this illustrative example, compressed air environment 10 includes a plurality of pneumatic systems 12 in platform 14. As depicted, platform 14 takes the form of aircraft 16.

Pneumatic systems 12 are physical systems in platform 14 that use compressed air to operate. As depicted in this example, pneumatic systems 12 include at least one of left wing anti-icer (WAI) 20, a right wing anti-icer (WAI) 22, a left wing pneumatically operated hydraulic system 24, a right wing pneumatically operated hydraulic system 26, a left air conditioning (L AC) pack 30, a right air conditioning (R AC) pack 32, a potable water unit 40, an auxiliary power unit (APU) 42, a cargo heater 44, a first air-driven pump (ADP) 46, a nitrogen generation system (NGS) 48, a second air driven pump (ADP) 50, and a Total Air Temperature probe (TAT) 52.

As discussed above, the pneumatic systems 12 have compressed air requirements, referred to herein as performance demands, to enable their efficient operation. These performance demands may change during operation of platform 14. For example, when platform 14 takes the form of aircraft 16, the performance demands may change depending on at least one of the phase of flight or other types of operation of aircraft 16. The phase of flight may include at least one of static ground, taxiing, take off, initial climb, en route, maneuvering, approach, descent, landing, or other phases of flight for aircraft 16.

In operation, the compressed air 102 supplied to the pneumatic systems 12 via a manifold 104 is generated by an air supply compressor system 100. In this illustrative example, the air supply compressor system 100 includes a variable speed air compressor 110 and a compressor controller 112 that controls the operation of the variable speed air compressor 110 in generating compressed air 102 for the pneumatic systems 12. In particular, the compressor controller 112 operates the variable speed air compressor 110 to control the supply of compressed air 102 to the pneumatic systems 12.

Compressor controller 112 may be implemented in software, hardware, firmware, or a combination thereof. When software is used, the operations performed by compressor controller 112 may be implemented in program code configured to run on hardware, such as a processor unit. When firmware is used, the operations performed by compressor controller 112 may be implemented in program code and data and stored in persistent memory to run on a processor unit. When hardware is employed, the hardware may include circuits that operate to perform the operations in compressor controller 112.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 2:
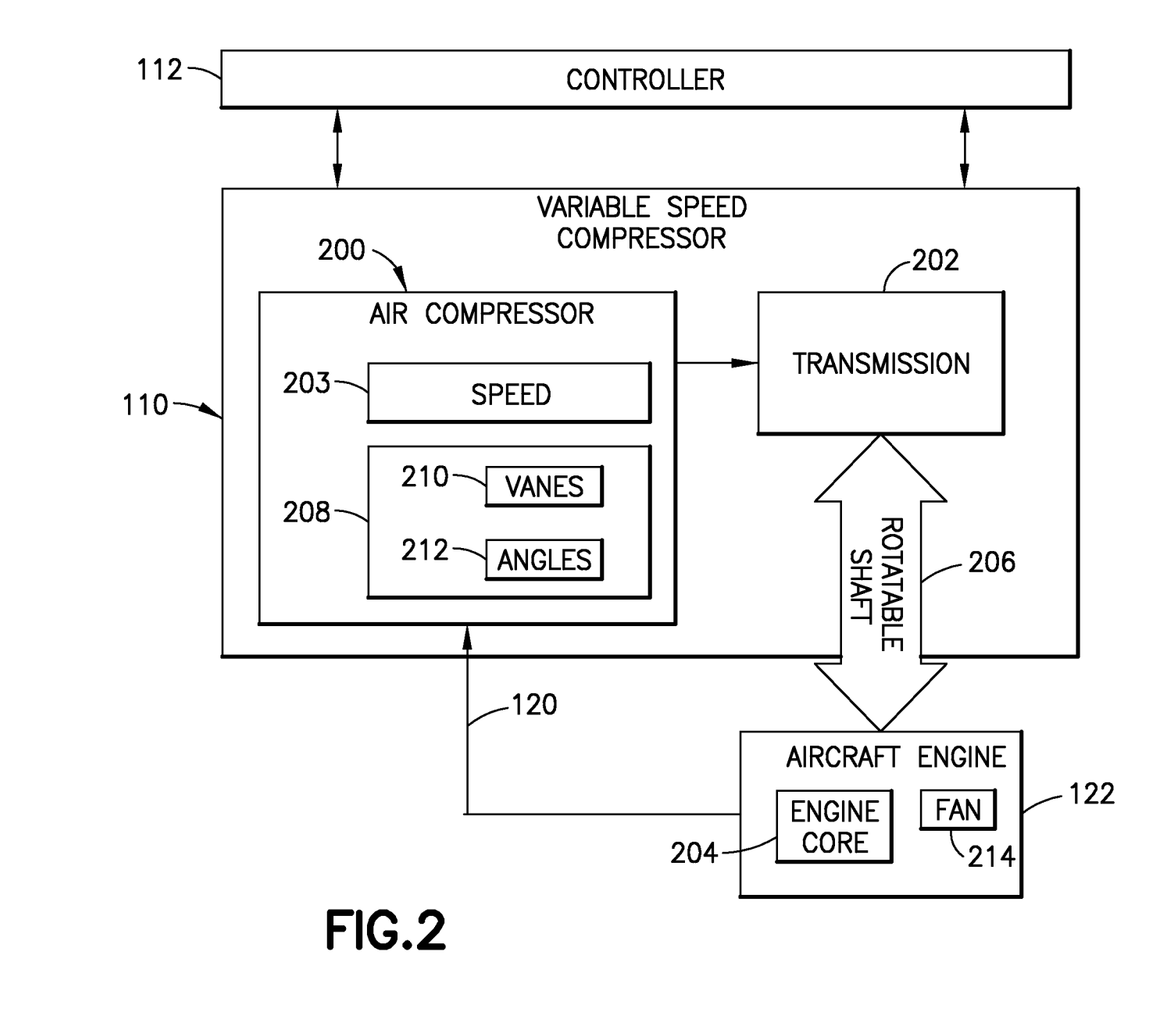
FIG. 2 is an illustration of a variable speed air compressor in accordance with an illustrative embodiment.

FIG. 2 is an illustration of the variable speed air compressor 110 shown in FIG. 1 in accordance with an illustrative embodiment. In this illustrative example, the variable speed air compressor 110 comprises an air compressor 200 and a transmission 202. Variable speed air compressor 110 is configured to modify the pressure and/or flow rate of air 121 received from an aircraft engine 122 to meet the performance demands of pneumatic systems 12.

As depicted, the aircraft engine 122 includes an engine core (high speed spool) 204 and an engine fan 214. Transmission 202 is connected to engine core 204 by shaft 206. Engine core 204 provides power to air compressor 200 through transmission 202. In the exemplary embodiment, the transmission 202 may be coupled to the accessory gearbox on the engine core 204 such that the accessory gearbox is configured to drive the transmission 202 via the shaft 206. In other exemplary embodiments, the transmission 202 may be coupled to, and thus driven by, the low speed spool which also drives the engine fan 214, or an intermediate spool.

In this illustrative example, transmission 202 is configured to adjust a speed 203 of air compressor 200. For example, rotatable shaft 206 can mechanically couple engine core 204 and transmission 202. Thus as shaft 206 is rotated by engine core 204, power is provided to drive/rotate the variable speed air compressor 110. In yet another illustrative example, power may be provided to transmission 202 through another component other than engine core 204. For example, an auxiliary power unit, or some other source of power may be used in place of, or in addition to, engine core 204.

Air compressor 200 also includes a geometry 208. Geometry 208 is a variable geometry that may be changed to adjust one or more parameters in the variable speed air compressor 110, such as at least one of the compressor output pressure and/or the compressor output flow rate. For example, geometry 208 may take the form of vanes 210. Vanes 210 are located in a location selected from at least one of an input (inlet) to air compressor 200 or an output (outlet) from air compressor 200. In this illustrative example, vanes 210 are configured to change angles 212 to vary the pressure and/or flow rate of the compressed air 102 supplied by the variable speed air compressor 110 to the pneumatic systems 12. In yet another illustrative example, geometry 208 may take other forms in addition to or in place of vanes 210. For example, a variable diffuser also may be used in addition to or in place of vanes 210 that have adjustable angles.

Additionally, transmission 202 is in communication with compressor controller 112. The operation of transmission 202 is controlled by compressor controller 112. Geometry 208 also may be changed by compressor controller 112. For example, compressor controller 112 can change angles 212 of vanes 210. Thus, the compressor controller 112 controls at least one of a speed of variable speed air compressor 110 or geometry 208 of variable speed air compressor 110 to enable the variable speed air compressor 110 to supply compressed air 102 to meet the performance demands of the pneumatic systems 12.

Referring again to FIG. 1, the air supply compressor system 100 also includes a pre-cooler 140. Sensors in the form of pressure sensor 150, pressure sensor 152, temperature sensor 154, and flow sensor 156 are also present in air supply compressor system 100. The air supply compressor system 100 also includes valves in the form of heat surge control valve (HSCV) 160, surge relief valve 162, outlet shut off valve 164, and fan air valve (FAV) 166.

In operation, pressure sensor 152, temperature sensor 154 and flow sensor 156 detect the pressure, temperature and flow, respectively, of compressed air flowing through the line 170 from the output of air compressor 200.

Moreover, pressure sensor 150 detects the pressure of air input into air compressor 200 through line 120, which in the illustrated embodiment, is connected to engine fan 214. In the exemplary embodiment, the air input to the air compressor 200 is received from the engine fan 214 via the line 120. Optionally, the air compressor 200 may receive input air from the engine core 204 (i.e. bleed air), any other available pneumatic system, or ambient air. Pressure sensor 150 provides one of the data points that is used to identify the compressor operating point, also referred to herein as a map point, on a compressor map.

Figure 5:
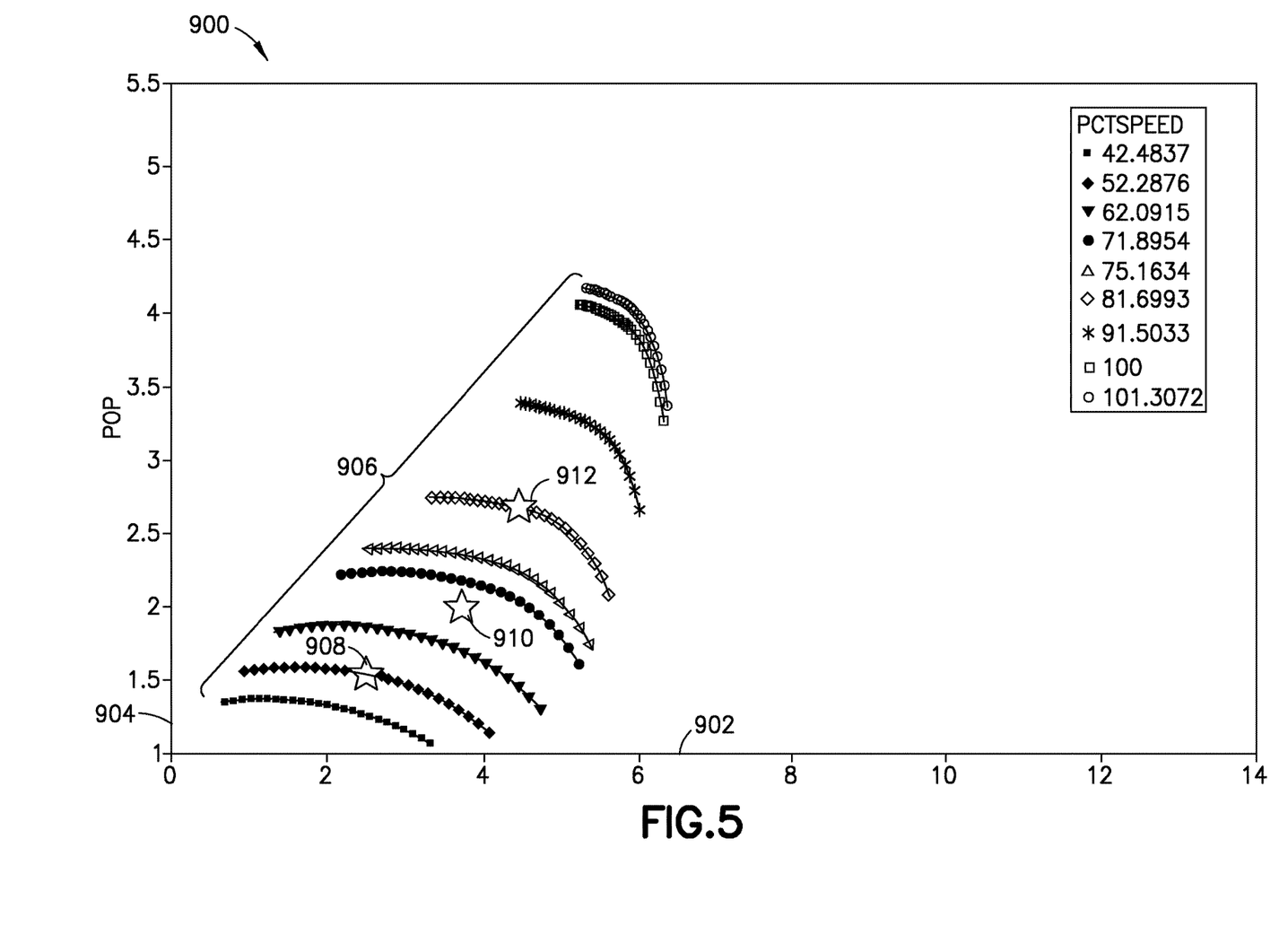
FIG. 5 is an illustration of a graph of operating parameters for compressor operating map points in accordance with an illustrative embodiment.

As used herein, a compressor map is a graph that describes the performance characteristics, which may include for example, efficiency, mass flow range, boost pressure capability, and/or rotational speed of a particular compressor. An exemplary compressor map 900 is illustrated in FIG. 5. Additionally, as used herein a "map point" refers to an operating point on the compressor map. For example, a first map point may represent the current or actual pressure and/or flow rate being generated by the compressor. Whereas, a second map point, referred to herein as a target map point, may represent a pressure and/or flow rate that the compressor is required to output to satisfy the performance demands of at least one of the pneumatic systems. As an example, label or point 908 may represent an initial compressor operating map point whereas label or point 912 may represent a target compressor operating map point 136.

As shown in FIG. 5, X-axis 902 represents corrected flow and Y-axis 904 represents pressure ratio for a single compressor operating at different compressor rotational speeds. Lines 906 represents the maximum combinations of pressure and airflow that can be achieved by the compressor at different compressor speeds.

In this example, point 908, point 910, and point 912 are compressor operating map points. Point 908 represents a compressor operating map point at sea level that meets requirements from an air conditioning system in the aircraft. Point 910 represents a compressor operating map point at 22,000 feet that meets requirements for the same air conditioning system. Point 912 represents a compressor operating map point that meets requirements for the air conditioning system when the aircraft is at a cruising level.

In this illustrative example, increased efficiency is present at running the compressor at the middle of each line in lines 906. As depicted, reducing flow may be more efficient through reducing the compressor speed, and increasing the flow may be more efficient through increasing the speed of the compressor. Depending on the size of the flow changes, compressor geometries, such as inlet guide vanes, can be changed along with variable diffuser settings in the geometry of the compressor.

Referring again to FIG. 1, in operation, pre-cooler 140 operates to reduce an operational temperature of the compressed air discharged from the air compressor 200 and flowing through line 170. In the exemplary embodiment, fan discharge air is also used as a cooling medium to reduce an operational temperature of the compressed air discharged from the air compressor 200 via line 170. In operation, the fan air valve (FAV) 166 controls the amount of cooling medium (fan air) supplied to the pre-cooler 140. More particularly, and in the exemplary embodiment, fan air is extracted from the engine fan circuit and is used as the heat sink for the pre-cooler heat exchanger in pre-cooler 140, which is used to cool the compressor outlet air flow through line 170.

As depicted, line 172 is a feedback loop in the air supply compressor system 100. The feedback loop may feed compressed air back into air compressor 200. This feedback may be performed to increase the temperature of the compressed air and/or to provide flow to avoid operation of the compressor in surge. In this illustrative example, heat surge control valve (HSCV) 160 controls feedback loop line 172. Heat surge control valve (HSCV) 160 is in communication with compressor controller 112. Surge relief valve 162 is configured to bleed off air when heat surge control valve (HSCV) 160 is unable to provide sufficient flow, or the compressor outlet temperature, as measured by temperature sensor 154 exceeds overheat limits, or a combination thereof is present such that additional flow is needed to avoid operation of the compressor in surge.

As depicted, outlet shut off valve 164 is connected to pre-cooler 140 and manifold 104. In operation, the shut off valve 164 prevents reverse airflow when the air supply compressor system 100 is not operating and the manifold 104 is pressurized by another source, such as the auxiliary power unit (APU) 42, a second engine compressor system (engine mounted on opposite wing), or an external pneumatic air source. Manifold 104 includes a plurality of valves to enable the compressed air 102 to be supplied to the plurality of pneumatic systems 12.

As depicted, the valves in manifold 104 include a modulating valve 180, a check valve 181, a modulating valve 182, a shut off valve 183, a shut off valve 184, a modulating valve 185, a modulating valve 186, a check valve 187, a modulating valve 188, a shut off valve 189, a modulating valve 190, a modulating valve 191, a modulating valve 192, a shut off valve 193, and a check valve 194. In the illustrative examples, modulating valve 185 and modulating fan air valve (FAV) 166 may take the form of shut off valves in some illustrative examples. In operation, the plurality of valves are opened, closed, or regulated to enable the compressed air 102 to be supplied to the each of the plurality of pneumatic systems 12. In particular, the plurality of valves are opened, closed, or regulated to enable such that the compressed air 102 supplied to the each of the plurality of pneumatic systems 12 meets the individual performance demands for each individual system. One or more of the plurality of valves may be referred to as a manifold isolation valve that is closed when a downstream leak or rupture is detected.

Figure 3:
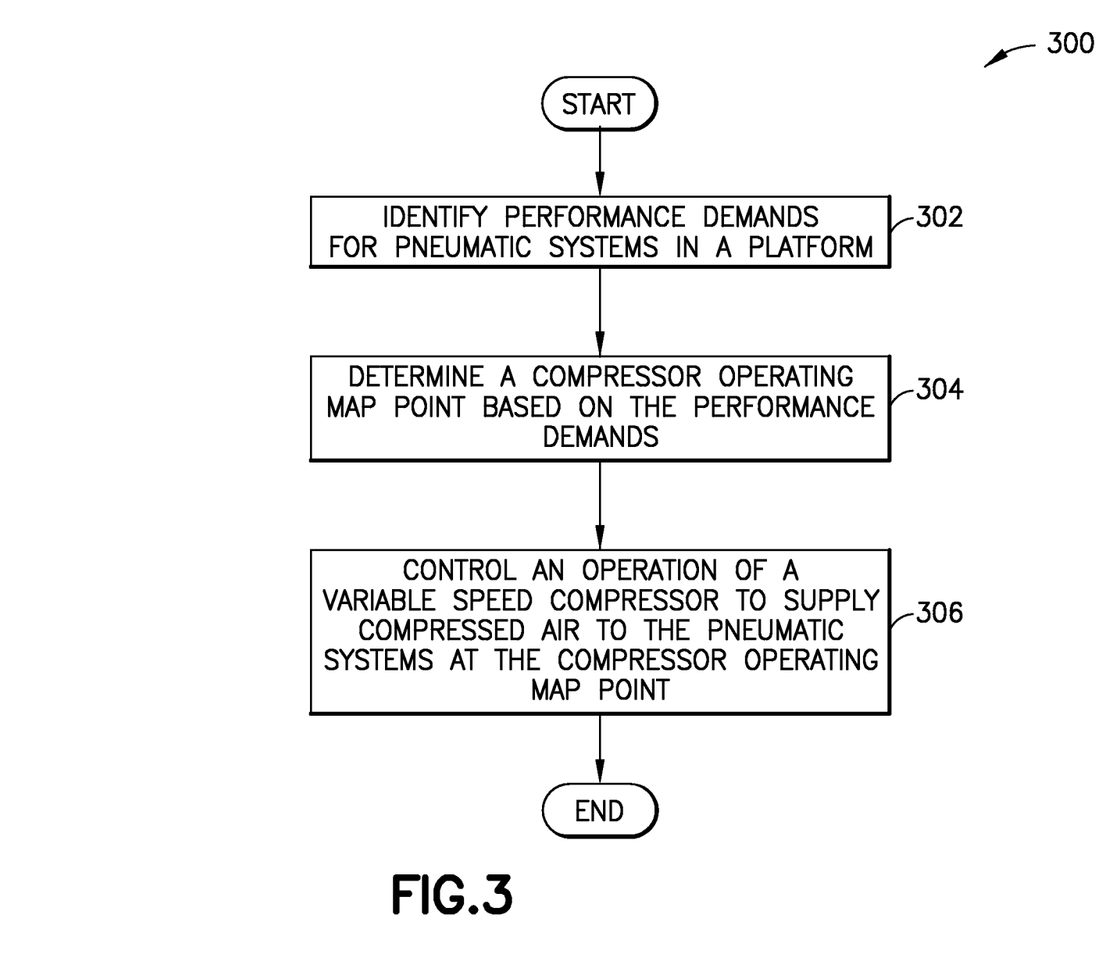
FIG. 3 is an illustration of a flowchart of a process for controlling compressed air sent to pneumatic systems in accordance with an illustrative embodiment.

FIG. 3 is a flowchart of a process 300 for controlling compressed air sent to pneumatic systems in accordance with an illustrative embodiment. The process 300 can be implemented in compressed air environment 10 shown in block form in FIG. 1. For example, the different operations can be implemented in compressor controller 112 to control the production of compressed air 102 by air supply compressor system 100 in platform 14.

The process 300 begins by identifying performance demands 132 (shown in FIGS. 4A and 4B) for pneumatic systems 12 in a platform (operation 302). The performance demands 132 indicate needs for compressed air for the pneumatic systems.

Figure 4A:
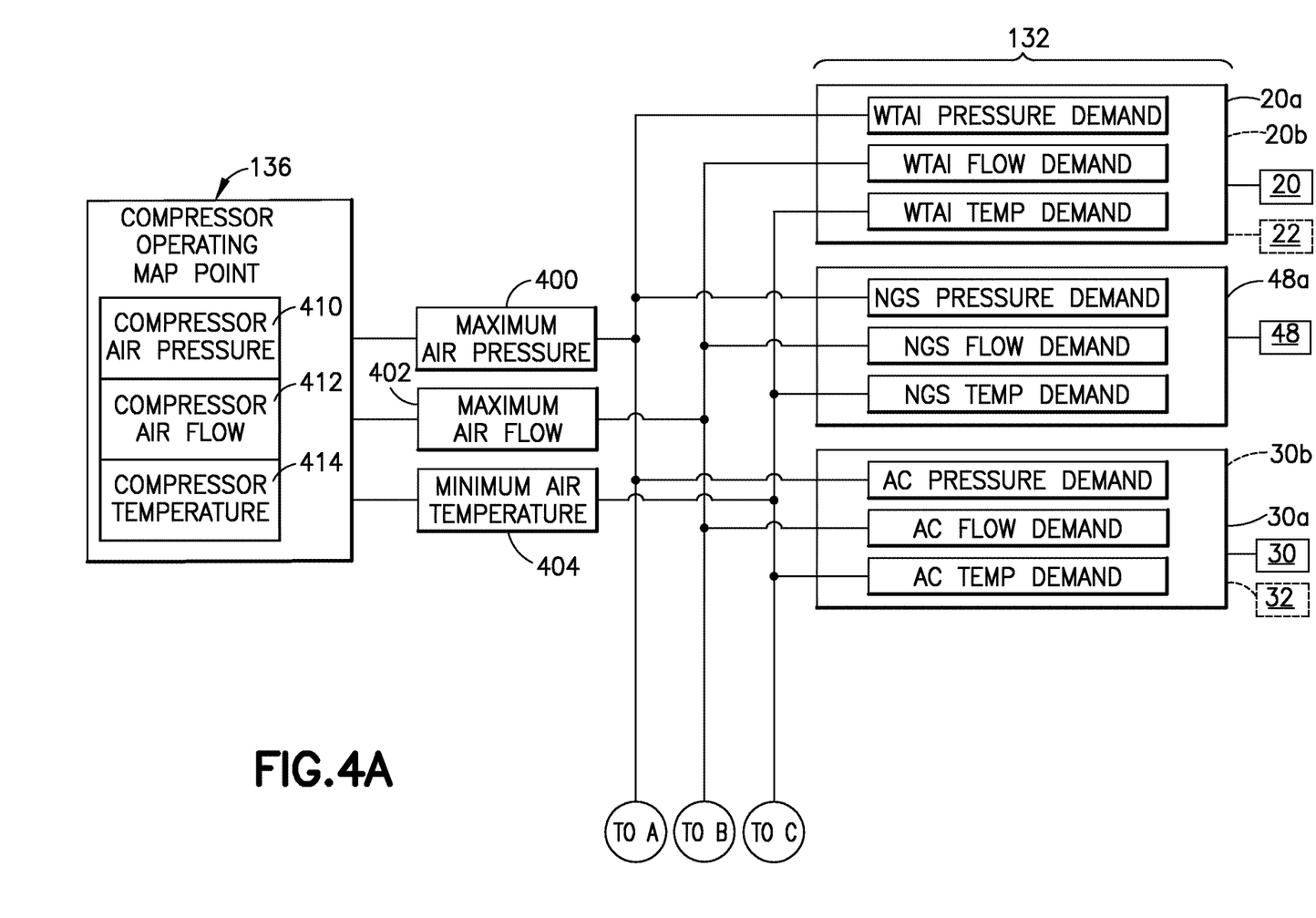
FIGS. 4A and 4B are an illustration of a block diagram of determining a compressor operating map point in accordance with an illustrative embodiment.
Figure 4B:
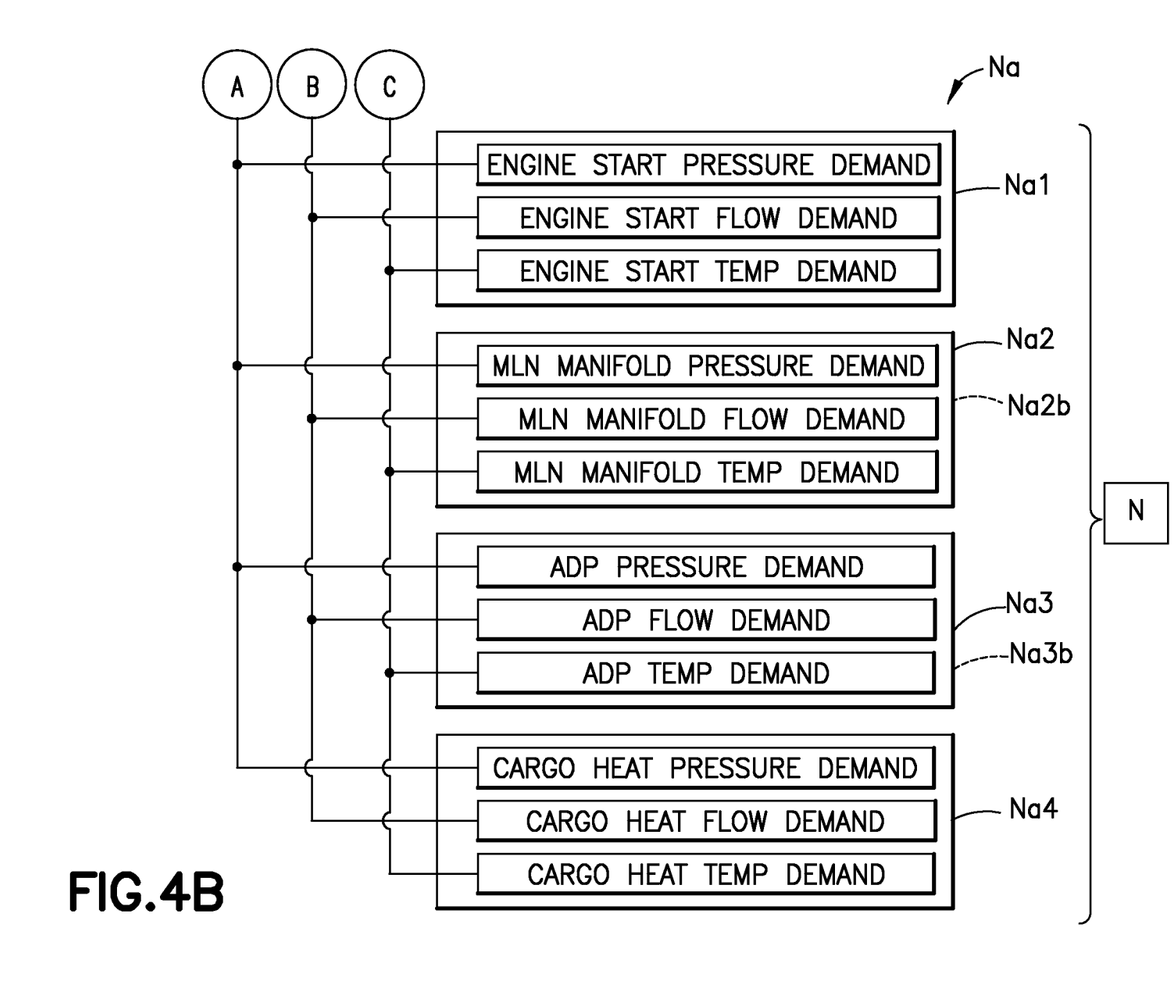

FIGS. 4A and 4B depict example performance demands 132 that may include air pressure, air flow, and/or temperature. As described above, one or more of the pneumatic systems 12 generate performance demands 132. Moreover, performance demands are an optimal pressure, flow rate, and/or temperature of compressed air that is required by a pneumatic system to enable the pneumatic system to operate at a peak efficiency. In the exemplary embodiment, pneumatic systems 12 may require compressed air that meets multiple performance demands. Thus, each of the pneumatic systems 12 shown in FIG. 1 may have a set of performance demands 132 that are required for that particular pneumatic system to operate at peak efficiency.

Although performance demands 132 for a few of the pneumatic systems 12 are illustrated, it should be realized that performance demands 132 may be generated for all of the pneumatic systems 12 or only a portion of the pneumatic systems 12.

In the illustrated embodiment, performance demands 132 are generated for the left wing anti-icer (WAI) 20, the left air conditioning (L AC) pack 30, and the nitrogen generation system (NGS) 48. The blocks label N are used to designate performance demands Na1-Na4 that may be generated for some or all of the remaining pneumatic systems 12. Thus in the illustrated embodiment, a set of performance demands 20a represent performance demands received from the left wing anti-icer (WAI) 20 (a similar set of performance demands 20b represent the right wing anti-icer (WAI) 22), a set of performance demands 30a represent performance demands received from the left air conditioning (L AC) pack 30 (a similar set of performance demands 30b represent the right air conditioning (R AC) pack 32), a set of performance demands 48a represent performance demands received from the nitrogen generation system (NGS) 48, a set of performance demands Na1 represent performance demands received from the auxiliary power unit (APU) 42, a set of performance demands Na2 represent performance demands received from the left wing pneumatically operated hydraulic system 24 (a similar set of performance demands Na2b represent the right wing pneumatically operated hydraulic system 26), a set of performance demands Na3 represent performance demands received from the first air-driven pump (ADP) 46 (a similar set of performance demands Na3b may be provided for the second air driven pump (ADP) 50), and a set of performance demands Na4 represent performance demands received from the cargo heater 44.

In the exemplary embodiment, minimum air temperature 404 is an optional performance demand 132 in this illustrative example as described in more detail below. With respect to temperature, the air temperature of compressed air 102 can be controlled by regulating the heat surge control valve (HSCV) 160 and/or the fan air valve (FAV) 166. Optionally, or in addition to using the heat surge control valve 160 and/or the fan air valve 166, the temperature of compressed air 102 may be regulated using at least one of a feedback system in the variable speed air compressor 110, the precooler 140 connected to an output of the variable speed air compressor 110, or some other suitable device or system.

It should be realized that each of the pneumatic systems 12 will have its own unique operational requirements and thus will also have its own unique set of performance demands 132. Thus, if M pneumatic systems 12 (where M is an integer) are being supplied compressed air from the air supply compressor system 100, the compressor controller 112 may receive up to M sets of performance demands 132, one from each respective pneumatic system 12.

In operation, the pneumatic systems 12, shown in block form in FIG. 1, can send performance demands 132, shown in FIGS. 4A and 4B, to compressor controller 112, shown in block form in FIG. 1, dynamically during the operation of the platform. For example, performance demands 132, for each of the pneumatic systems 12, may be included in requests or messages sent to compressor controller 112 from pneumatic systems 12.

In other illustrative examples, performance demands 132 may be known ahead of time. In other words, performance demands 132 may be predetermined for pneumatic systems 12 such that pneumatic systems 12 do not need to send performance demands 132 to compressor controller 112. Compressor controller 112 can locate performance demands 132 in a database 139 or some other data structure and determine which ones are to be used.

For example, a pressure and airflow for a pneumatic system used with the flaps of an aircraft may be known ahead of time for particular phases of flight, maneuvers, or other operations. When the particular phase of flight, maneuver, or other operations are present, then the performance demands 132 for that pneumatic system can be automatically input to the compressor controller 112. These performance demands may be stored in a library, a file, or some other data structure for use by controller 112 as different phases of flight, maneuvers, or other operations occur.

In operation, controllers (not shown) in the pneumatic systems 12 may generate performance demands 132 that are sent to compressor controller 112 in air supply compressor system 100. Optionally, for less complex systems, the performance demands 132 may be stored as a priori information in the database 139 within the computer system 130. Further, these performance demands 132 can be generated dynamically during the operation of the aircraft. In other illustrative examples, the performance demands 132 may be known ahead of time and generated based on flight parameters such as phase of flight, maneuvers being performed, airspeed, and other flight factors.

Referring again to FIG. 3, the process 300 then determines a compressor operating map point 136 based on the performance demands 132 (operation 304).

In this illustrative example, compressor controller 112 is in communication with pneumatic systems 12 and is configured to identify performance demands 132 for the pneumatic systems 12. Compressor controller 112 is also configured to determine a compressor operating map point 136 based on the performance demands 132 received from the pneumatic systems 12 or the a priori information as discussed above.

Referring again to FIGS. 4A and 4B, the compressor controller 112 determines a single compressor operating map point 136, which may also be referred to herein as the target map point 136, based on the M sets of performance demands 132 received from the M pneumatic systems 12. In generating the compressor operating map point 136 based on performance demands 132, compressor controller 112 selects a maximum air pressure 400, from the received air pressure performance demands 132, as the compressor air pressure 410 in compressor operating map point 136. Compressor controller 112 also selects the maximum air flow 402, from the received air flow performance demands 132, as compressor air flow 412 in compressor operating map point 136. Further, compressor controller 112 selects the minimum air temperature 404, from the received air temperature performance demands 132, as compressor air temperature 414 in compressor operating map point 136.

As a result, the compressor operating map point 136 specifies the compressor air pressure 410, the compressor air flow 412, and the compressor air temperature 414 for compressed air 102 to meet the needs of at least one of pneumatic systems 12.

Referring again to FIG. 3, the process 300 controls an operation of a variable speed air compressor 110 to supply compressed air 102 to the pneumatic systems 12 at the compressor operating map point 136 (operation 306). In operation, compressor controller 112 is configured to control operation of the variable speed air compressor 110 to supply compressed air 102 to pneumatic systems 12 while maintaining the variable speed air compressor 110 at the desired compressor operating map point 136 and below a maximum allowable compressor air discharge temperature limit 138. The maximum allowable compressor air discharge temperature limit 138 may be predetermined based on requirements such as hot surface fuel ignition temperature limits for fuel leakage zones. Material limits and time vs. temperature material property knockdowns may also feed into maximum temperature limits for some flight phases. The fuel ignition limit is not a dynamic parameter. The limits for material property (if applicable) may be a dynamic parameter based on flight phase and system operational status. In operation, the process controls at least one of a speed 203 of the variable speed air compressor 110 or a geometry 208 of the variable speed air compressor 110 to supply the compressed air 102 to the pneumatic systems 12 at the compressor operating map point 136.

Further, it should be realized that the performance demands 132 can change in different modes of operation. As depicted, these modes of operation can include a primary mode of operation, a high transient mode of operation, and a low demand mode of operation.

For example, when the compressed air environment 10 is operating in a primary mode of operation, the compressor controller 112 is configured to operate the variable speed air compressor 110 to meet the performance demands 132 of either the left air conditioning (L AC) pack 30 or the right air conditioning (R AC) pack 32. In particular, the compressor controller 112 transmits a signal to either the left air conditioning pack flow control valve (FCV) 182 or the right air conditioning pack flow control valve (FCV) 189 is driven to full open and the variable speed air compressor 110 is operated to meet the performance demands of either the left air conditioning (L AC) pack 30 or the right air conditioning (R AC) pack 32. The left air conditioning pack flow control valve (FCV) 182 or the right air conditioning pack flow control valve (FCV) 189 is controlled to full open by its respective air conditioning controller, while the air supply compressor system 100 controls the operation of the variable speed air compressor 110 to achieve the desired pack flow. In the exemplary embodiment, during operation both pack FCV's 182 and 189 are operated in a fully open position and the variable speed air compressor 119 is driving to meet the needs of the both the left air conditioning (L AC) pack 30 and the right air conditioning (R AC) pack 32 concurrently.

In the primary mode of operation, the other pneumatic systems 12, e.g. systems other than left air conditioning (L AC) pack 30 and/or the right air conditioning (R AC) pack 32, each control the operation of their respective inlet valves to meet their respective performance demands. As an example, assuming that the variable speed air compressor 110 is operating to meet the performance demands of the left air conditioning (L AC) pack 30, thus the inlet to the left air conditioning (L AC) pack 30 is fully open, the inlet valves of the remaining pneumatic systems 12, whose performance demands are not being directly met by the variable speed air compressor 110, are regulated to achieve their own individual performance demands. In particular, modulating valve 180 is operated to control the airflow to the left wing anti-icer (WAI) 20, check valve 181 is operated to control the airflow to a reservoir of the left wing pneumatically operated hydraulic system 24, etc. This function can be managed by individual user system controllers. If the remaining pneumatic systems 12 cannot achieve desired minimum performance demands, air supply manifold pressure can be increased as needed. In this mode, specific fuel consumption is reduced.

A high transient demand mode can occur when high compressor air is demanded. This demand can originate from, for example, at least one of the first and second air driven pumps (ADP) 46, 50. In this mode, compressor controller 112 is configured to operate the variable speed air compressor 110 to control the air supply manifold pressure and temperature necessary to meet the demands of the pneumatic systems 12 other than the primary users, i.e. the left air conditioning (L AC) pack 30 and the right air conditioning (R AC) pack 32. In this example, the variable speed air compressor 110 is operated to meet the performance demands of the at least one of the first and second air driven pumps (ADP) 46, 50. Optionally, the compressor controller 112 is configured to operate the variable speed air compressor 110 to control the air supply manifold pressure and temperature necessary to meet the demands of the pneumatic systems 12. The determination of the downstream pneumatic systems can be managed by at least one of the individual air supply controllers or via communication from individual pneumatic systems 12 to the compressor controller 112. In this illustrative example, the left air conditioning pack flow control valve 182 and/or the right air conditioning pack flow control valve 189 is modulated to a reduced flow level. This function can be managed by air-conditioning pack controllers.

A low demand mode is when an air supply demand is low. An air supply demand may be low, for example, when one of the left air conditioning (L AC) pack 30 or the right air conditioning (R AC) pack 32 is turned off and other control measures (e.g., speed, heat surge control valve (HSCV), and variable geometry) cannot maintain sufficient compressor surge margin. In this situation, the surge relief valve 162 is opened or modulated as needed. This function can be controlled by the compressor controller 112.

Control systems may also turn off one air supply compressor system (ASCS) and utilize only one engine's air supply compressor system (ASCS) to feed air supply manifold and satisfy the user system needs. As depicted, this function can be managed by at least one of air supply controllers or a compressor controller. For example, the control systems may control the compressor so that the compressor speed is brought to zero rpm and close the outlet shut off valve 164 when a compressor system (ASCS) is shut off. The control systems may also shut off one compressor system (ASCS) and close a manifold isolation valve (such as those described above) when a downstream leak or rupture is detected.

In one illustrative example, one or more technical solutions are present that overcome a technical problem with supplying compressed air to pneumatic systems with a desired level of efficiency. As a result, one or more technical solutions may provide a technical effect of supplying compressed air 102 to pneumatic systems 12 in a manner that increases the efficiency of a platform such as aircraft 16. More specifically, efficiency may be increased for aircraft engine 122. Additionally, one or more technical solutions may provide a technical effect of meeting performance demands 132 for a pneumatic system requiring the greatest pressure, airflow, temperature, or some combination thereof.

As a result, computer system 130 operates as a special purpose computer system in which compressor controller 112 in computer system 130 enables controlling compressed air 102 to at the compressor operating map point 136 in a manner that meets performance demands 132 for pneumatic systems 12 as closely as desired. In particular, compressor controller 112 transforms computer system 130 into a special purpose computer system as compared to currently available general computer systems that do not have compressor controller 112.

The illustration of compressed air environment 10 and the different components in this environment in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the illustrative examples are described with respect to aircraft 16, another illustrative example may be applied to other types of platforms. Platform 14 may be, for example, a mobile platform, a stationary platform, a land-based structure, an aquatic-based structure, and a space-based structure. More specifically, platform 14 may be a surface ship, a tank, a personnel carrier, a train, a spacecraft, a space station, a satellite, a submarine, an automobile, a power plant, a bridge, a dam, a house, a manufacturing facility, a building, and other suitable platforms.

In some illustrative examples, the performance demands for the pneumatic systems are known ahead of time for different phases of flight. As a result, receiving requests directly from the pneumatic system is unnecessary. Instead, correlating the current phase of flight, maneuver, or other operations with no performance demands for the pneumatic systems that operate during the current phase of flight, maneuver, or other operation can be used to identify performance demands for the pneumatic systems. In this manner, the compressor operating map point can be determined. Further, the compressor operating map point can be determined ahead of time for different phases of flight, maneuvers, or other operations in the same manner.

As depicted in FIG. 1, computer system 130 is a physical hardware system and includes one or more data processing systems. Computer system 130 may include one or more data processing systems within the avionics of aircraft 16. When more than one data processing system is present, those data processing systems are in communication with each other using a communications medium. The communications medium may be a network. The data processing systems may be selected from at least one of a computer, a server computer, or some other suitable data processing system.

Thus, in the illustrative examples a controller for a variable speed air compressor is configured to determine the appropriate compressor operating map point from performance demands for pneumatic systems in a platform. The controller controls the operation of the variable speed air compressor to generate compressed air at a target compressor operating map point. This control may be performed by controlling at least one of the speed or geometry of the variable speed air compressor.

As a result, a speed of the compressor can be varied to ensure that compressed air was delivered to this particular system requiring the desired pressure and flow such that no pressure regulation is required. The remaining pneumatic systems can receive the compressed air at the desired performance demands through controlling the valve system.

In general, the variable speed air compressor can meet the needs of the pneumatic system requiring at least one of greatest pressure or flow of compressed air at any given point, while also enabling the remaining systems to regulate the compressed air for their own needs.

Thus, one or more illustrative examples can enable improvements in flight idle thrust (especially in icing); address airplane descent performance issues caused by high idle requirements, reduce specific fuel consumption, improved ground idle; address airplane ground handling and brake wear issues caused by high idle requirements; reduce impact on engine core sizing due to maximum continuous thrust in icing; reduce pressures and temperatures for pneumatic systems equipment; eliminates a need for large pre-cooler (and associated impacts to weight, spatial integration, & fan duct performance); reduce thermal impacts to adjacent structure and equipment; increase flexibility for spatial integration and materials selection; reduce insulation and shielding requirements; reduce leak detection requirements and associated threats; and increase flexibility for engine integration (high spool versus low spool horse power extraction).

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling compressed air sent to pneumatic systems, the method comprising:
   acquiring a set of performance demands for each of a plurality of pneumatic systems in a platform, wherein the performance demands indicate needs for the compressed air supplied to each of the pneumatic systems;
   identifying a maximum allowable compressor air discharge temperature limit of a variable speed air compressor configured to supply compressed air to the plurality of pneumatic systems;
identifying at least one of a maximum air pressure, a maximum air flow rate, and a minimum air temperature for each of the plurality of pneumatic systems;
selecting a maximum air pressure from the identified maximum air pressures;
selecting a minimum air temperature from the identified minimum air temperatures; and
controlling an operation of the variable speed air compressor to supply the compressed air to the plurality of pneumatic systems to meet the acquired performance demands for at least one of the pneumatic systems while operating the variable speed air compressor below the maximum allowable compressor air discharge temperature limit, wherein the operation of the variable speed air compressor to supply the compressed air to the at least one of the pneumatic systems is controlled to meet the selected maximum air pressure and the minimum air temperature.

2. The method of claim 1 further comprising controlling a speed of the variable speed compressor to meet a desired compressor system output pressure.

3. The method of claim 1 further comprising:
identifying a desired compressor operating map point for operating the variable speed air compressor at peak efficiency based on the acquired performance demands and the identified maximum allowable compressor air discharge temperature limit; and
controlling a geometry of the variable speed air compressor to achieve the compressor operating map point for peak efficiency and a predetermined surge margin.

4. The method of claim 3 further comprising controlling a surge relief valve to supply the compressed air to the plurality of pneumatic systems at the identified desired compressor operating map point while inhibiting the compressor from operating in a compressor surge condition.

5. The method of claim 3 further comprising controlling a heat surge control valve to supply the compressed air to the plurality of pneumatic systems at the identified desired compressor operating map point, inhibiting the compressor from operating in a compressor surge condition, and operating the compressor below the maximum allowable compressor air discharge temperature limit.

6. The method of claim 3 wherein the variable speed air compressor comprises a plurality of adjustable vanes positioned at either an input or an output of the compressor, the method further comprising changing an angle of the adjustable vanes to achieve the operating map point.

7. The method of claim 1 further comprising controlling a fan air valve to maintain a temperature of the compressed air below the maximum allowable compressor air discharge temperature limit.

8. The method of claim 1 wherein the plurality of pneumatic systems comprise an air conditioning pack, the method further comprising: positioning an air conditioning pack flow control valve to a fully open position when an air conditioning pack demand is selected as the maximum air pressure from the performance demands; and regulating a position of the air conditioning pack flow control valve to regulate a compressed airflow rate delivered to the air conditioning pack when the air conditioning pack demand is not selected as the maximum air pressure.

9. The method of claim 1 wherein the plurality of pneumatic systems comprise an air conditioning pack, the method further comprising: positioning an air conditioning pack flow control valve to a fully open position when an air conditioning pack demand is selected as the maximum air pressure from the performance demands; and regulating an airflow rate to the remaining plurality of pneumatic systems.

10. The method of claim 1 further comprising:
monitoring at least one compressor condition, the at least one compressor condition including at least one of a compressor speed, compressor inlet pressure, a compressor outlet pressure, a compressor outlet temperature, and a flow rate of the variable speed air compressor; and
controlling at least one of a speed or geometry of the variable speed air compressor, a surge relief valve, a heat surge control valve, and a fan air valve based on the monitored compressor condition.

11. The method of claim 1 further comprising: identifying a minimum desired pneumatic manifold pressure; and controlling a surge relief valve to maintain the identified minimum desired manifold pressure when the pneumatic system performance demands are low as in a case where most, or all of the plurality of pneumatic systems are not operating.

12. The method of claim 1 wherein the platform includes two compressor systems and the method further comprises shutting off one compressor system of the two compressor systems when the pneumatic system performance demands are low and only one operating compressor system is needed.

13. The method of claim 12 further comprising controlling the compressor speed, of the one compressor system, to zero rpm and closing an outlet shut off valve when the one compressor system is shut off.

14. The method of claim 1 wherein the platform includes two compressor systems and the method further comprises shutting off one compressor system of the two compressor systems and closing a manifold isolation valve of the one compressor system when a downstream leak or rupture is detected.

15. The method of claim 1, wherein the variable speed air compressor is driven by an aircraft engine core through a mechanical transmission.

16. A compressed air system for an aircraft, the compressed air system comprising:
a variable speed air compressor configured to supply compressed air to a plurality of pneumatic systems in a platform;
a compressor controller coupled to the variable speed air compressor, the compressor controller being configured to:
acquire a set of performance demands for each of the plurality of pneumatic systems, wherein the performance demands indicate needs for the compressed air supplied to each of the pneumatic systems;
identify a maximum allowable compressor air discharge temperature limit of the variable speed air compressor, and
control an operation of the variable speed air compressor to supply the compressed air to the plurality of pneumatic systems to meet the acquired performance demands for at least one of the pneumatic systems while operating the variable speed air compressor below the maximum allowable compressor air discharge temperature limit, wherein the compressor controller identifies a desired compressor operating map point for operating the variable speed air compressor at peak efficiency based on the acquired performance demands and the identified maximum allowable compressor air discharge temperature limit, and controls a geometry of the variable speed air compressor to achieve the compressor operating map point for peak efficiency and a predetermined surge margin.

17. The compressed air system of claim 16 wherein the controller is further configured to identify at least one of a maximum air pressure, a maximum air flow rate, and a minimum air temperature for each of the plurality of pneumatic systems.

18. The compressed air system of claim 17 wherein the controller is further configured to: select a maximum air pressure from the identified maximum air pressures; select a minimum air temperature from the identified minimum air temperatures; and control an operation of the variable speed air compressor to supply the compressed air to the at least one of the plurality of pneumatic systems to meet the selected maximum air pressure and the minimum air temperature.

19. The compressed air system of claim 16 further comprising a mechanical transmission that mechanically couples the variable speed air compressor to an engine core, the mechanical transmission includes a drive shaft configured to transmit power from the engine core to the variable speed air compressor for driving the variable speed air compressor.

20. The compressed air system of claim 16 wherein the variable speed air compressor comprises a plurality of adjustable vanes positioned at either an input or an output of the compressor, the controller being configured to change an angle of the adjustable vanes to achieve the operating map point.

* * * * *